(12) United States Patent
Van Beest et al.

(10) Patent No.: US 11,250,043 B2
(45) Date of Patent: Feb. 15, 2022

(54) CLASSIFICATION OF LOG DATA

(71) Applicant: NATIONAL ICT AUSTRALIA LIMITED, Eveleigh (AU)

(72) Inventors: Nick Van Beest, Eveleigh (AU); Ingo Weber, Eveleigh (AU)

(73) Assignee: National ICT Australia Limited, Eveleigh (AU)

(*) Notice: Subject to any disclaimer, the term of this patent is extended or adjusted under 35 U.S.C. 154(b) by 101 days.

(21) Appl. No.: 16/306,077

(22) PCT Filed: Jun. 2, 2017

(86) PCT No.: PCT/AU2017/050540
§ 371 (c)(1),
(2) Date: Nov. 30, 2018

(87) PCT Pub. No.: WO2017/205936
PCT Pub. Date: Dec. 7, 2017

(65) Prior Publication Data
US 2019/0138542 A1 May 9, 2019

(30) Foreign Application Priority Data
Jun. 3, 2016 (AU) ................ 2016902166

(51) Int. Cl.
G06F 16/35 (2019.01)
G06F 21/55 (2013.01)
(Continued)

(52) U.S. Cl.
CPC .......... *G06F 16/35* (2019.01); *G06F 11/3072* (2013.01); *G06F 11/3476* (2013.01);
(Continued)

(58) Field of Classification Search
CPC .... G06F 16/35; G06F 16/9024; G06F 21/552; G06F 11/3438; G06F 11/3476;
(Continued)

(56) References Cited

U.S. PATENT DOCUMENTS 9,367,809 B2 6/2016 Puri et al.
2009/0193294 A1 7/2009 Nakamura et al.
(Continued)

FOREIGN PATENT DOCUMENTS

EP 2863309 A2 4/2015
WO WO2015/053773 A1 4/2015

OTHER PUBLICATIONS

Rogge-Solti, Andreas, and Gjergji Kasneci. "Temporal anomaly detection in business processes." In International Conference on Business Process Management, pp. 234-249. Springer, Cham, 2014. (Year: 2014).*
(Continued)

*Primary Examiner* — Jesse P Frumkin
(74) *Attorney, Agent, or Firm* — Cooper & Dunham; Paul Teng

(57) ABSTRACT

This disclosure relates to analyzing log data of a system. This comprises evaluating a first graph model with multiple log events in the log data. The first graph model comprises a first set of nodes connected by a first set of edges representing a first behaviour. A processor determines a first correspondence value based on the first graph model and indicative of a correspondence between the multiple log events and the first behaviour. The processor repeats the steps of evaluating the first graph model for one or more further graph models representing one or more further behaviors and determining the first correspondence value to determine one or more further correspondence values. The processor finally determines a classification of the multiple
(Continued)

log events as representing one of the behaviors based on the correspondence values. The use of multiple graph models allows a more granular classification than binary intrusion detection.

19 Claims, 14 Drawing Sheets

(51) Int. Cl.
*G06F 16/901* (2019.01)
*G06F 11/34* (2006.01)
*G06F 11/30* (2006.01)

(52) U.S. Cl.
CPC ........ *G06F 16/9024* (2019.01); *G06F 21/552* (2013.01); *G06F 11/3438* (2013.01)

(58) Field of Classification Search
CPC .... G06F 11/3072; G06F 16/901; G06F 21/55; G06F 11/34; G06F 11/30
See application file for complete search history.

(56) References Cited

U.S. PATENT DOCUMENTS

| | | | |
|---|---|---|---|
| 2015/0106324 A1* | 4/2015 | Puri | G06F 11/079 706/52 |
| 2016/0125094 A1* | 5/2016 | Li | G06F 16/9024 707/741 |
| 2016/0253232 A1 | 9/2016 | Puri et al. | |
| 2016/0371489 A1* | 12/2016 | Puri | H04L 63/1425 |

OTHER PUBLICATIONS

Weber, Ingo, Andreas Rogge-Solti, Chao Li, and Jan Mendling. "CCaaS: Online Conformance Checking as a Service." In BPM (Demos), pp. 45-49. 2015. (Year: 2015).*

Van Beest, Nick RTP, Marlon Dumas, Luciano García-Bañuelos, and Marcello La Rosa. "Log delta analysis: Interpretable differencing of business process event logs." In International Conference on Business Process Management, pp. 386-405. Springer, Cham, 2016. (Year: 2016).*

Wüchner, Tobias, Martin Ochoa, and Alexander Pretschner. "Robust and Effective Malware Detection through Quantitative Data Flow Graph Metrics." arXiv preprint arXiv:1502.01609 (2015) (Year: 2015).*

International Search Report dated Jun. 23, 2017 in connection with International Patent Application No. PCT/AU2017/050540 filed Jun. 2, 2017.

Written Opinion dated Jun. 23, 2017 in connection with International Patent Application No. PCT/AU2017/050540 filed Jun. 2, 2017.

Roland Rieke et al., "Security Compliance Tracking of Processes in Networked Cooperating Systems", Journal of Wireless Mobile Networks, Ubiquitous Computing, and Dependable Applications (JoWua) 6.2 (2015).

Hamid Reza Motahari-Nezhad et al., "Event correlation for process discovery from web service interaction logs", The VLDB Journal—The International Journal on Very Large Data Bases 20.3 (2011).

Tobias Wüchner et al., "Robust and Effective Malware Detection through Quantitative Data Flow Graph Metrics", International Conference on Detection of Intrusions and Malware, and Vulnerability Assessment, Springer International Publishing, 2015.

J. Cui, "Anomalous pattern detection using process mining", Thesis (master's), Eindhoven University of Technology, Apr. 4, 2016 [retrieved from the internet on Jun. 16, 2017] <URL:https://pure.tue.nl/ws/files/46933214/844321-1.pdf>.

Dec. 12, 2019 European Search Report in connection with European patent application No. 17805416.9.

R. Milne et al., "TIGER: real-time situation assessment of dynamic systems", Intelligent Systems Engineering, vol. 3, No. 3, pp. 103-124 (1994).

Shubhadip Mitra et al., "Spatio-Temporal Patterns for Problem Determination in IT Services", IEEE International Conference on Services Computing, pp. 49-56 (2009).

* cited by examiner

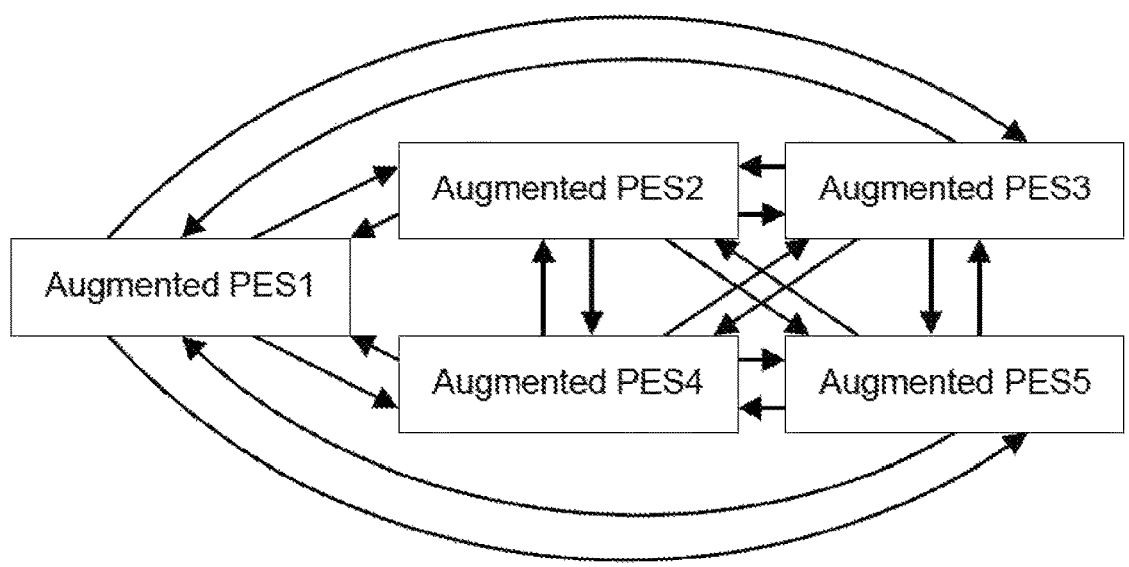
Fig. 7
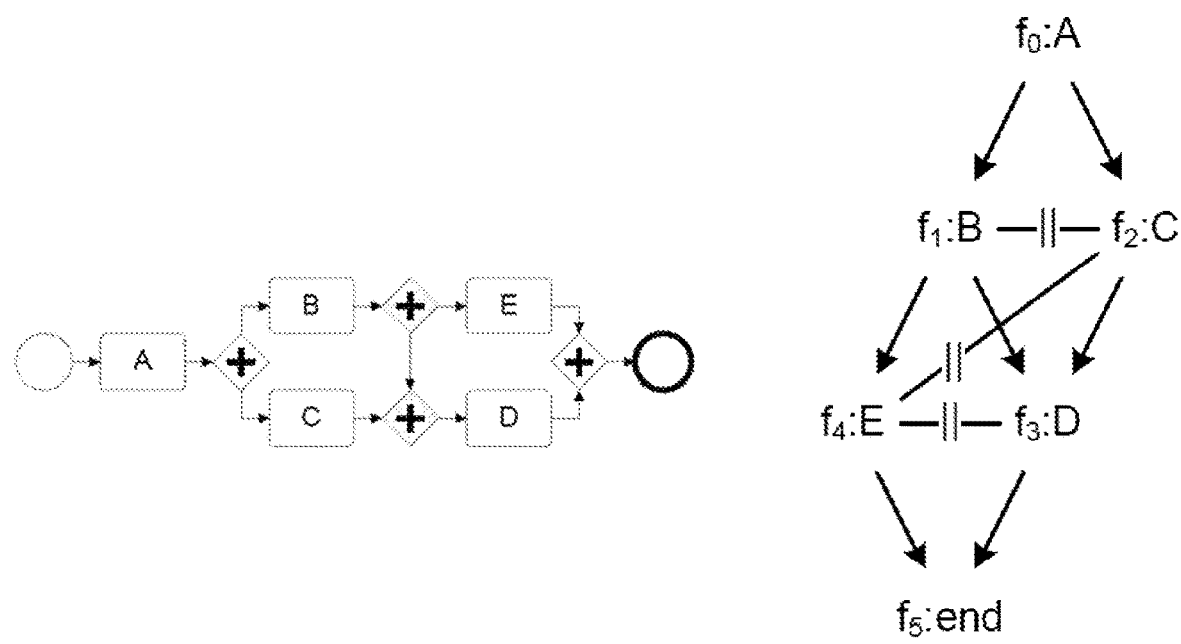
Fig. 8a
Fig. 8b

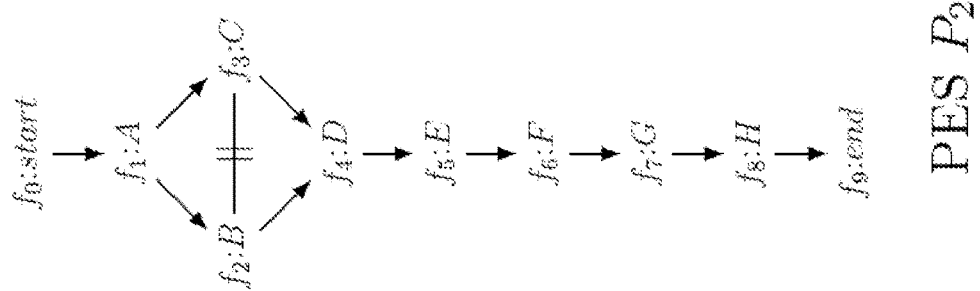
Fig. 13b  PES $P_2$
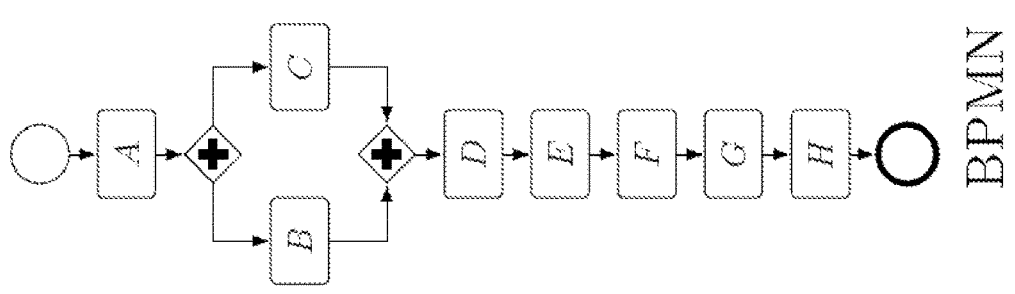
Fig. 13a  BPMN
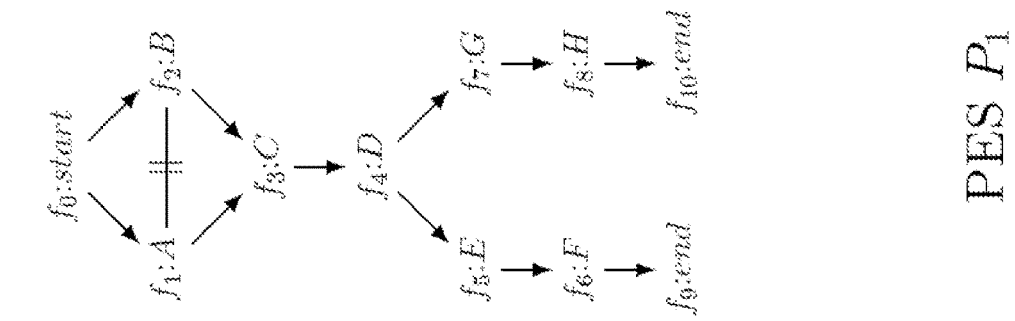
Fig. 12b  PES $P_1$
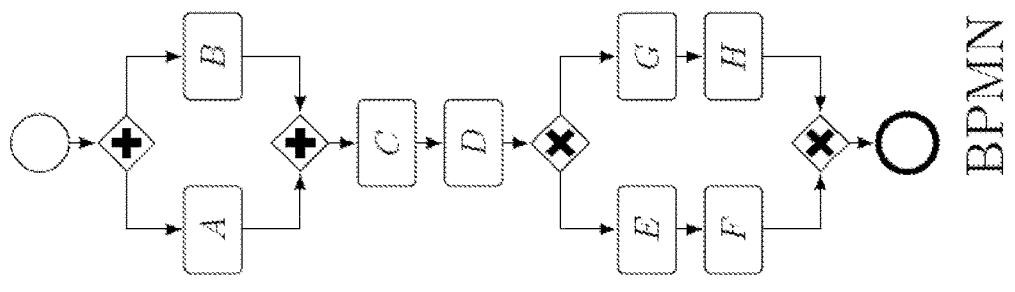
Fig. 12a  BPMN

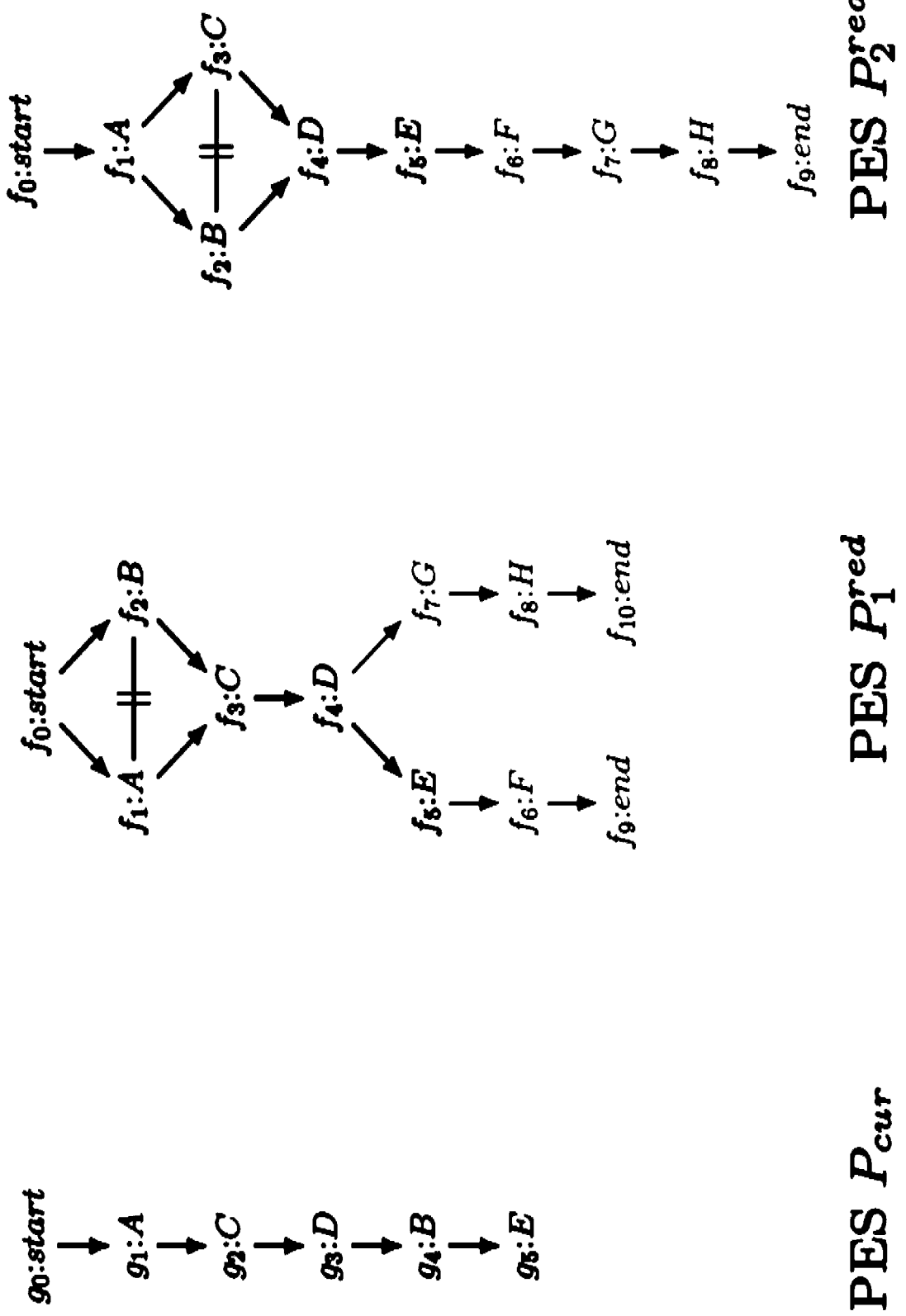
Fig. 14c PES $P_2^{red}$
Fig. 14b PES $P_1^{red}$
Fig. 14a PES $P_{cur}$

CLASSIFICATION OF LOG DATA

CROSS-REFERENCE TO RELATED APPLICATIONS

The present application claims priority from Australian Provisional Patent Application No 2016902166 filed on 3 Jun. 2016, the content of which is incorporated herein by reference.

TECHNICAL FIELD

This disclosure relates to analyzing log data of a system, such as, but not limited to analyzing log data generated by an internet server, to increase stability (uptime) and/or security of the system.

BACKGROUND

Many technical systems continuously generate log data to document the activities performed by the systems. For example, online shops generate log data that represents activities of customers on the website, engine control units generate log data that represents engine parameters, such as throttle and charge pressure, or surveillance systems generate log data that indicates the activities undertaken by observed persons.

The log data can be useful to monitor the system and detect any malfunctioning or intrusion or other hacking attacks, for example. It is particularly useful, where there is the need to collect information faster than a human can possibly collect the information. However, it is difficult to analyze the log data in a meaningful manner because often the log data does not clearly fall into one category, such as 'malicious attack', in order to raise an alarm.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

An internet server comprises:
a user input port connected to the internet to create user events based on user input received via the internet;
a logging module to create log data comprising multiple log events representing the user events and to store the log data on a database;
a data store to store a first graph model comprising data records representing a first set of nodes and data records representing a first set of edges, the first set of nodes being connected by a first set of edges to represent a first user behavior represented by historical log data of the first user behavior and to store further graph models representing further user behaviors;
a processor to
evaluate the first graph model with the multiple log events in the log data by determining a first path according to the multiple log events between nodes within the first set of nodes along edges in the first set of edges,
determine a first correspondence value based on the first path, the first correspondence value being indicative of a correspondence between the multiple log events and the first user behavior,
repeat the steps of evaluating the first graph model for the one or more further graph models representing one or more further user behaviors and determine the first correspondence value to determine one or more further correspondence values, and
determine a classification of the multiple log events as representing one of the user behaviors based on the correspondence values; and
an output module to generate an output signal that causes the internet server to perform an action depending on the classification.

A method for analyzing log data of a system comprises:
evaluating a first graph model with multiple log events in the log data, wherein the first graph model comprises a first set of nodes connected by a first set of edges representing a first behavior;
determining a first correspondence value based on the first graph model indicative of a correspondence between the multiple log events and the first behavior;
repeating the steps of evaluating the first graph model for one or more further graph models representing one or more further behaviors and determining the first correspondence value to determine one or more further correspondence values; and
determining a classification of the multiple log events as representing one of the behaviors based on the correspondence values.

It is an advantage that a graph model can represent complex behavior with multiple log events which leads to more accurate classification. Further, the use of multiple graph models allows a more granular classification than binary intrusion detection. It is a further advantage that it is possible to determine the paths on a partial log trace, which means the method can provide runtime classification of actual behavior. This allows more targeted responses and may reduce down-time due to unnecessary shut-downs (false positives) that may have occurred with existing methods. In other words, existing methods may detect an attack where the methods disclosed herein raise a warning. On the other hand, existing methods may classify the behaviour as normal because it does not match against a malicious behaviour. The methods disclosed herein can still raise a warning to warn an operator earlier. As a result, the method increases dependability (more stable, increased uptime), security and safety.

Evaluating the first graph model may comprise determining a first path according to the multiple log events between nodes within the first set of nodes along edges in the first set of edges. Determining the first correspondence value may be based on the first path.

The first correspondence value may be indicative of a correspondence between the order of the multiple log events and the order of the nodes on the first path.

Determining the first correspondence value may comprise:
creating a log graph model that represents the multiple log events;
performing multiple steps that simultaneously traverse the log graph model and the first graph model to determine at each step a match or mismatch between a node of the log graph model and the first graph model; and determining the first correspondence value based on the match or mismatch.

Determining the first correspondence value may comprise determining a matching set of nodes that match the multiple log events and the correspondence value is based on a number of elements in the matching set of nodes.

Determining the first correspondence value may comprise determining a mismatching set of nodes that do not match the multiple log events and the correspondence value is based on a number of elements in the mismatching set of nodes.

Determining the first correspondence value may be based on subtraces of consecutive events.

The first correspondence value may be based on a branching probability associated with each edge along the first path.

The first correspondence value may be based on timing information associated with one or more nodes or edges of the first graph model.

The timing information may be a probability distribution of the time associated with the event.

The first correspondence value may be based on an alignment value associated with each edge or node of the first graph model, wherein the alignment value is indicative of a level of alignment with each of the further graph models.

The method may further comprise generating an alert based on the determined classification. The system may be a computer system. The first behavior may be a malicious behavior.

The step of determining the classification may comprise determining the classification before creating a further log event.

The step of determining the classification may comprise determining the classification before reaching a terminal node of the first graph model.

The method may further comprise:
receiving historical log data and associated behavior labels; and
determining the nodes and edges of the first graph model based on the historical log data and associated behavior labels.

The method may further comprise determining for each edge or for each node one or more of:
a branching probability;
alignment profiles; and
transition timing information.

The first graph model may be an event structure.

It is to be understood that any features of the first graph model and the first correspondence value equally apply to the further graph models and further correspondence values.

Software, when executed by a computer, causes the computer to perform the above method.

A computer system for analyzing log data comprises:
an input port to receive log data comprising multiple log events;
a memory to store a first graph model and one or more further graph models;
a processor
to evaluate the first graph model with the multiple log events in the log data, wherein the first graph model comprises a first set of nodes connected by a first set of edges representing a first behavior,
to determine a first correspondence value based on the first graph model, the first correspondence value being indicative of a correspondence between the multiple log events and the first behavior,
to repeat the steps of evaluating the first graph model for the one or more further graph models representing one or more further behaviors and determining the first correspondence value to determine one or more further correspondence values, and
to determine a classification of the multiple log events as representing one of the behaviors based on the correspondence values; and
an output port to output the determined classification.

Optional features described of any aspect of method, computer readable medium or computer system, where appropriate, similarly apply to the other aspects also described here.

BRIEF DESCRIPTION OF DRAWINGS

An example will be described with reference to

FIG. 7: Illustrates an overview of alignment profiles.

FIG. 8a illustrates an example of Behavior A (normative) in BPMN.

FIG. 8b illustrates an example of Behavior A (normative) as Prime Event Structure (PES).

FIGS. 12a and 12b illustrate an example Behavior 1 (normative).

FIGS. 13a and 13b illustrate an example Behavior 2 (deviant).

FIGS. 14a, 14b and 14c illustrate the trimming PES $P_1$ and $P_2$ to the length of the current execution.

DESCRIPTION OF EMBODIMENTS

Finding erroneous or malicious executions of a technical process may be based on expert knowledge and deep insights into the information system supporting the technical process. Automated methods to identify erroneous or malicious executions from logs, metrics, or other observable effects may be based on detecting deviations from a normal behavior of the process. A "single model of normative behavior" is used and an execution either conforms to that model, or not. If an execution deviates from the model, alarms or warnings will be triggered for each exception.

Disclosed herein is a method to automatically distinguish different behaviors and act appropriately based on the type of erroneous, malicious or normal behavior. The method allows for a much finer and more precise distinction between different behaviors by allowing to trigger alarms for crucial errors or malicious activities, but only warnings for exceptions. The behaviors may be learnt exclusively from externally observable logs and effects of a process. An approach presented herein goes beyond simple log analysis, as well as log analysis based on mere control flow at least by including resources, timing profiles and branching probabilities.

In addition, potentially harmful or problematic behavior may be identified during or even prior to its occurrence (through prediction) on-the-fly, raising alarms as early as observable. Automated intervention actions may be launched with the alarms.

Figure 1:
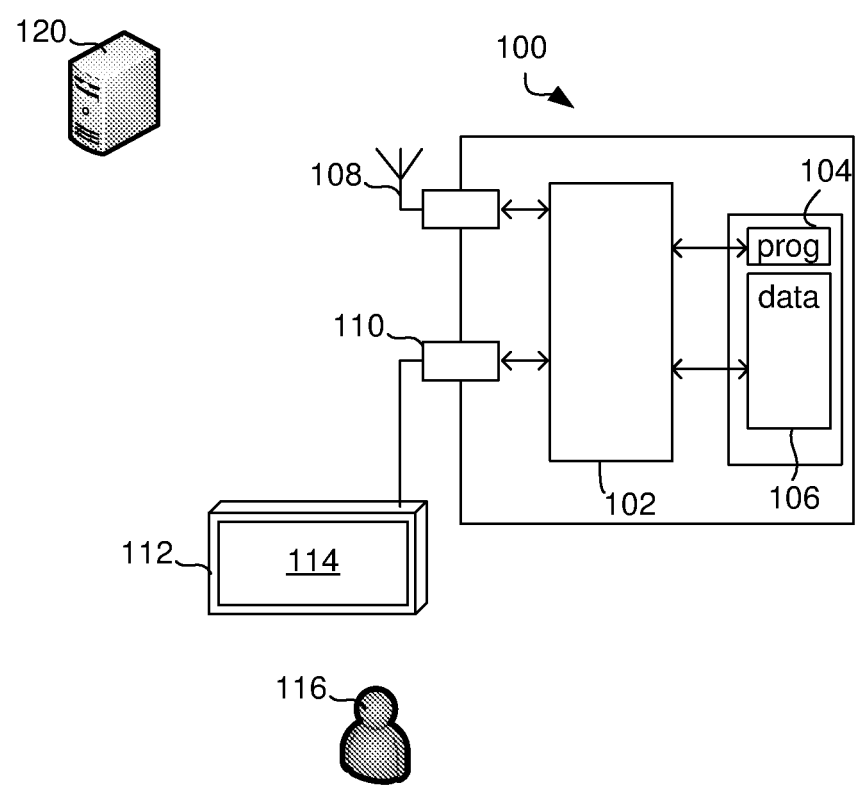
FIG. 1 illustrates a computer system for analyzing log data.

FIG. 1 illustrates a computer system 100 for analyzing log data of a server 120, such as an online shop. The computer system 100 comprises a processor 102 connected to a program memory 104, a data memory 106, a communication port 108 and a user port 110. The program memory 104 is a non-transitory computer readable medium, such as a hard drive, a solid state disk or CD-ROM. Software, that is, an executable program stored on program memory 104 causes the processor 102 to perform the method in FIG. 2, that is, processor 102 evaluates a first graph model, determines a first correspondence value, repeats these steps and finally determines a classification of the log events. The term "determining a classification" refers to determining a value that is indicative of the classification, such as a label, for example, by selecting one of multiple identifiers that each identify a respective behavior represented by a graphical model of the respective behavior. This also applies to related terms, such as "probabilities" and "likelihood".

The processor 102 may then store the classification on data store 106, such as on RAM or a processor register. Processor 102 may also send the determined classification via communication port 108 to a server, such as a monitoring or alarm system.

The processor 102 may receive data, such as log data, from data memory 106 as well as from the communications port 108 and the user port 110, which is connected to a display 112 that shows a visual representation 114 of the log data to a user 116. In one example, the processor 102 receives log data from web server 120 via communications port 108, such as by using a Wi-Fi network according to IEEE 802.11. The Wi-Fi network may be a decentralized ad-hoc network, such that no dedicated management infrastructure, such as a router, is required or a centralized network with a router or access point managing the network.

In one example, the processor 102 receives and processes the log data in real time. This means that the processor 102 determines the classification every time a log event is received from web server 120 and completes this calculation before the web server 120 sends the next log event update.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines or lightweight containers.

It is to be understood that any receiving step may be preceded by the processor 102 determining or computing the data that is later received. For example, the processor 102 determines a classification and stores the classification in data memory 106, such as RAM or a processor register. The processor 102 then requests the data from the data memory 106, such as by providing a read signal together with a memory address. The data memory 106 provides the data as a voltage signal on a physical bit line and the processor 102 receives the classification via a memory interface.

It is to be understood that throughout this disclosure unless stated otherwise, nodes, edges, graphs, solutions, variables, models and the like refer to data structures, which are physically stored on data memory 106 or processed by processor 102. Further, for the sake of brevity when reference is made to particular variable names, such as "classification" or "log event" this is to be understood to refer to values of variables stored as physical data in computer system 100.

Figure 2:
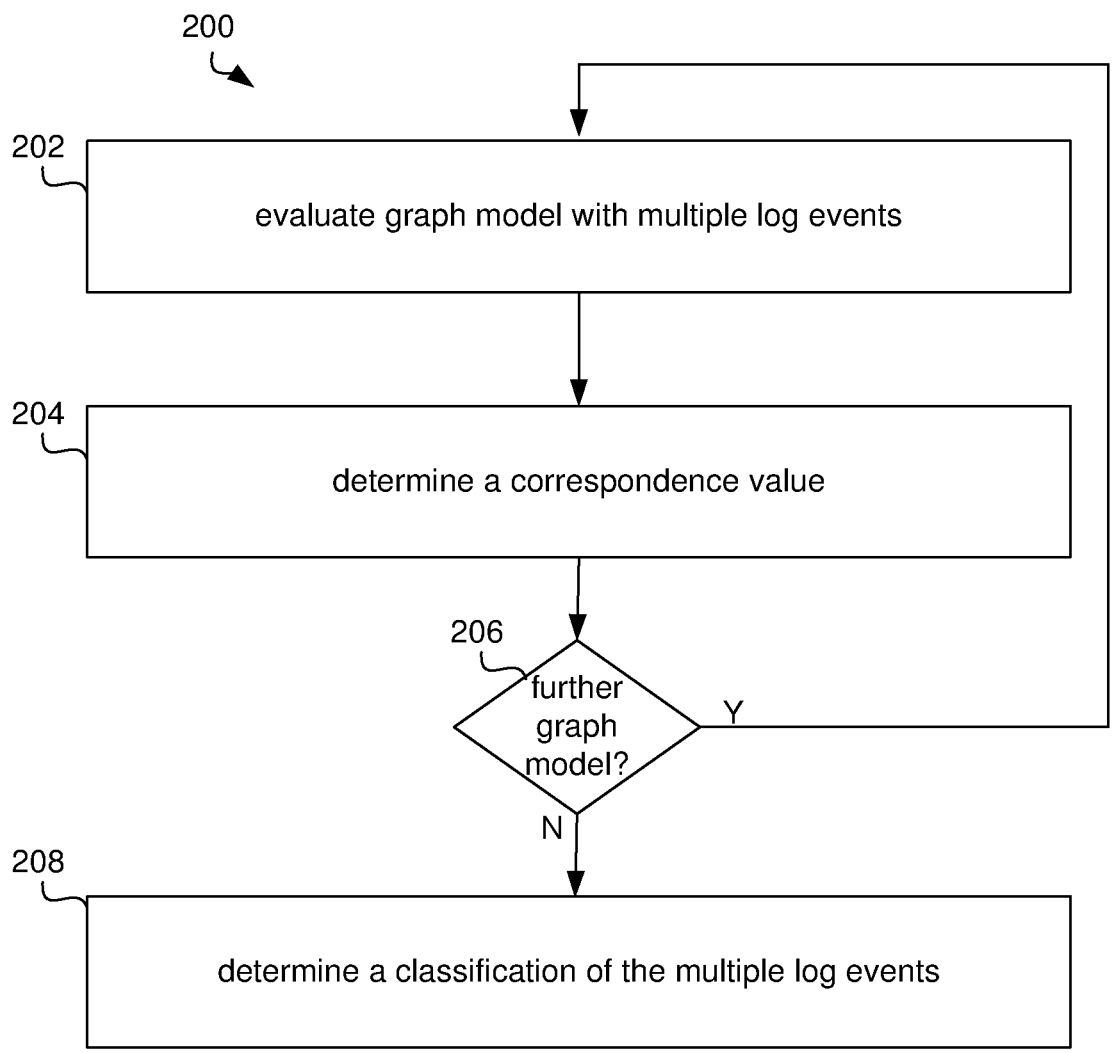
FIG. 2 illustrates a method for analyzing log data.

FIG. 2 illustrates a method 200 as performed by processor 102 for analyzing log data of a system. FIG. 2 is to be understood as a blueprint for the software program and may be implemented step-by-step, such that each step in FIG. 2 is represented by a function in a programming language, such as C++ or Java. The resulting source code is then compiled and stored as computer executable instructions on program memory 104.

Log data typically is a digital representation of multiple log events. Log data comprises a time and/or date stamp that indicates the time and/or date at which the event was logged or has occurred and the type of event that occurred. Each event may also comprise an event value. For example, where the system is a power plant, the log events may relate to flow through pipes. In that case, the time stamps would be periodical, the type of event would be a sensor reading and the value would be the flow through, such as liters per minute, of the pipe. Each log events may comprises further parameters that further characterize the log event.

The log data may be stored in the form of a text file on data memory 106 and each time a log event is created, a new line is appended to the log file. In other examples, the log data is stored on a database, such as a relational (SQL) database, and a new record is created each time an event is logged. In examples described herein, the webserver 120 uses built-in logging services to create the log data. That is, web server 120 appends log events to the log file or creates records in the log database. The log file may be stored on web server 120 or on analyzing system 100. Analyzing system 100 then accesses the log data either remotely from server 120 or locally from data memory 106. In other examples, analyzing system performs the monitoring and creates the log events itself.

The systems that may be monitored include computer systems, such as web-servers, mobile devices or personal computers, medical devices or industrial systems, such as manufacturing, energy generation or research systems. Further, people can be monitored, such as, in aged care the behavior of elderly people can be monitored to detect early signs of physical or mental problems that should be addressed.

Referring back to FIG. 2, processor 102 commences performing method 200 by evaluating a first graph model with multiple log events in the log data.

Figure 3:
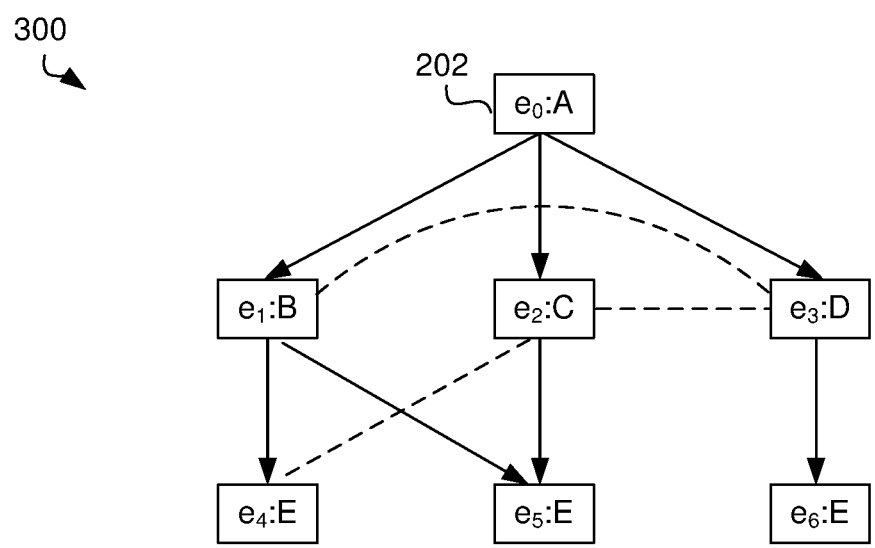
FIG. 3 illustrates a graph model as stored in the computer system of FIG. 1.

FIG. 3 illustrates a graph model 300 as stored on data memory 106, such as an event structure according to the detailed explanation below. The graph model 300 comprises a first set of nodes (depicted as rectangles) connected by a first set of edges (depicted as solid and dashed lines). This graph model 300 represents a particular behavior, such as a 'normal' or a 'malicious' behavior. Nodes are labelled by an event identifier followed by the label of the represented task, e.g. "$e_2$:C" tells us that event $e_2$ represents an occurrence of task "C".

A causality relation is depicted by solid edges whereas the conflict relation is depicted by dotted edges. These edges may be stored as class instances or database records with a type variable valued "cause" or "conflict", respectively. For the sake of simplicity, transitive causal and hereditary conflict relations are not depicted. Every pair of events that are neither directly nor transitively connected are in a concurrency relation. Note that three different events refer to the task with label "E". This duplication is used to distinguish the different states where task "E" occurs.

A state on an event structure (hereby called a configuration or path) is characterized by the set of events that have occurred so far. For instance, set e0:A; e1:B is the configuration or path where tasks "A" and "B" have occurred. In this configuration, event e3:D can no longer occur because it is in conflict with e1:B. On the other hand, events e2:C and e4:E can occur, but the occurrence of one precludes that of the other.

In one example, the proposed method uses Prime Event Structures to express control flow. A Prime Event Structure (PES) is a particular graph model of events representing a behavior. Each event e represents the occurrence of a task or activity in a process. PESs are described in N.R.T.P. van Beest and Marlon Dumas and Luciano Garca-Bañuelos and Marcello La Rosa, "Log Delta Analysis: Interpretable Differencing of Business Process Event Logs", Proc. of BPM 2015, pages 386-405, 2015, Springer. In a PES, multiple occurrences of the same activity are represented by different events.

Events can have the following binary relations: i) Causality (e<e') indicates that event e is a prerequisite for e'; ii) Conflict (e#e') implies that e and e' cannot occur in the same run; iii) Concurrency (e||e') indicates that no order can be established between e and e'.

The above is formalized as follows.

Definition 1 (Labeled Prime Event Structure): A Labeled Prime Event Structure over the set of event labels $\mathcal{L}$ is the tuple $\varepsilon = \langle E, \leq, \#, \lambda \rangle$ where:

E is a set of events,
$\lambda: E \to \mathcal{L}$ is a labeling function,
$\leq \subseteq E \times E$ is a partial order, referred to as causality,
$\# \subseteq E \times E$ is an irreflexive, symmetric conflict relation,
$\|:E^2 \setminus (< \cup <^{-1} \cup \#)$ is the concurrency relation, where < denotes the irreflexive causality relation.

The conflict relation satisfies the principle of conflict heredity, i.e. $e\#e' \wedge e' \leq e'' \Rightarrow e\#e''$ for $e, e', e'' \in E$.

Definition 2 (Frequency-enhanced Prime Event Structure (FPES)): A frequency-enhanced prime event structure is a tuple $\mathcal{F}(L) = \langle \varepsilon(L), \mathcal{O}, \mathcal{F} \rangle$ where $\varepsilon(L):\langle E, \leq, \#, \lambda \rangle$ is a prime event structure of log L, $\mathcal{O}: E \to \mathbb{N}$ is a function that associates an event [e] with the number of times its event label occurs in the event log, and corresponds to the cardinality of the equivalence class, i.e. $\mathcal{O}([e]) = |[e]|$, $\mathcal{P}: E \times E \to [0,1]$ is a function that associates a pair of events $[e_i]$ and $[e_j]$ with the probability of occurrence of $[e_j]$ given that event $[e_i]$ has occurred. This function is defined as:

$$\mathcal{P}([e_i], [e_j]) = \begin{cases} \mathcal{O}([e_j])/\mathcal{O}([e_i]) & \text{if } [e_i] \leq [e_j] \\ 0 & \text{Otherwise} \end{cases}$$

Event Logs

An event log consists of a set of traces, each containing the sequence of events produced by one execution of the process. An event in a trace refers to a task in the process and registers the start, end, abortion or other relevant state change of that task. Events in an event log are related via a total order induced by their timestamps.

An event log can defined formally as follows:

Definition 3 (Event log, Trace): Let L be an event log over the set of labels $\mathcal{L}$. Let E be a set of event occurrences and $\lambda: E \to \mathcal{L}$ a labeling function. An event trace $\sigma \in L$ is defined in terms of an order $i \in [0, n-1]$ and a set of events $E_\sigma \subseteq E$ with $|E_\sigma| = n$ such that $\sigma = \langle \lambda(e_0), \lambda(e_1), \ldots, \lambda(e_{n-1}) \rangle$. Moreover, two events $e_i, e_{i+1} \in E_\sigma$ can be expressed as $e_i \prec e_{i+1}$ meaning that event $e_{i+1}$ immediately follows event $e_i$.

Timing Profiles

Figure 4:
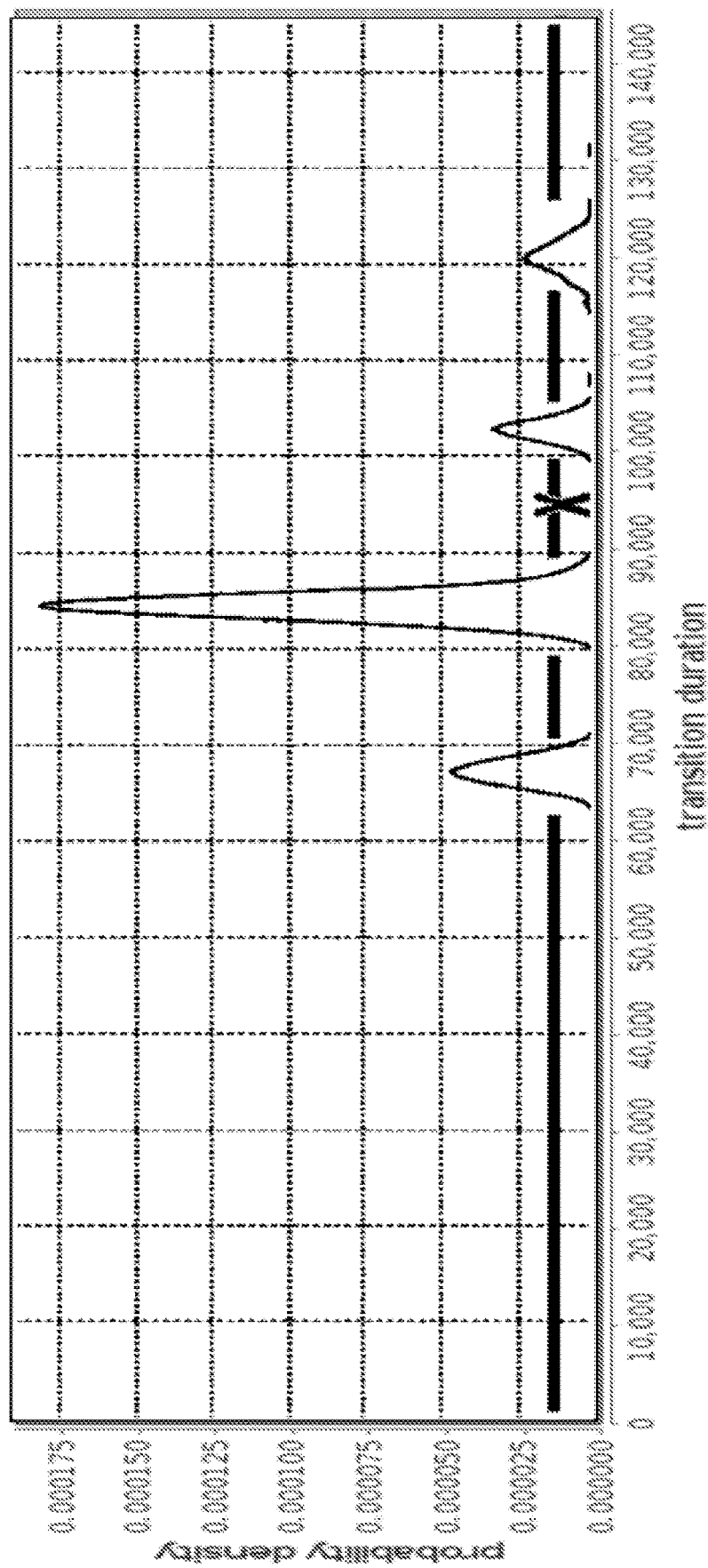
FIG. 4 illustrates a timing profile as duration distribution (peaks) with anomaly intervals (lines) and an anomaly ("X").

Processor 102 may create Timing Profiles from event logs and the contained timing information, i.e., the duration as the time that elapsed between two consecutive time-stamped events. Given a number of traces of the same process, processor 102 can fit duration distributions to the base data, i.e., the individual duration values from the different traces. One exemplar method is based on non-parametric kernel density estimates using Gaussian heaps. FIG. 4 shows an example of a duration distribution.

Given a large number of the duration values, processor 102 can fit a precise distribution function. From such a distribution, processor 102 can establish anomaly intervals, i.e., intervals on the time axis for which the likelihood of that value occurring is estimated to be less than a threshold, given the distribution. Depending on the requirements of a particular use case of this technology, the precise distribution function or the anomaly intervals can be used.

More information on timing profiles can be found in the following references which are incorporated herein by reference:

A. Rogge-Solti and G. Kasneci, "Temporal anomaly detection in business processes," in BPM, 2014 and I. Weber, A. Rogge-Solti, C. Li, and J. Mendling, "CCaaS: Online conformance checking as a service," in International Conference on Business Process Management, Demo Track, Innsbruck, Austria, August 2015, pp. 45-49.

Method

To accomplish behavioral classification of process executions, any observable aspects of the process may be taken into account. However, the following disclosure focuses on three dimensions: control-flow (i.e. order of activities), timing profiles (i.e. distribution of activity durations and distribution of waiting time between sets of subsequent activities), and branching probabilities (i.e. frequencies for branching to certain mutual exclusive execution paths). Each process execution can be assessed based on these criteria and subsequently placed in one of a plurality of behavioral categories. Some process executions may also be placed in multiple categories or no category in case of a new behavior. For example, consider the following five categories of common behaviors that process owners may wish to distinguish:

1. Normal process execution.
2. Normal process execution, but with some delays between or during activities or some minor differences in control-flow.
3. Exceptional process execution, for a number of identifiable exceptions.
4. Faulty process execution, leading to (system) errors/faults/failures.
5. Malicious process execution, either through an intruder or an internal player with malicious intent (fraud, extortion, etc).

For each of the behavioral categories, a set of training event logs is analyzed by the processor to learn the characteristics of each behavioral category. During runtime, current executions will be analyzed and matched by the processor to the closest behavior. This means, processor 102 may select one or multiple behaviors or none of the existing behaviors. In other words, processor 102 evaluates graph model 300 by determining a first path according to the multiple log events between nodes within the first set of nodes along edges in the first set of edges.

Figure 5:
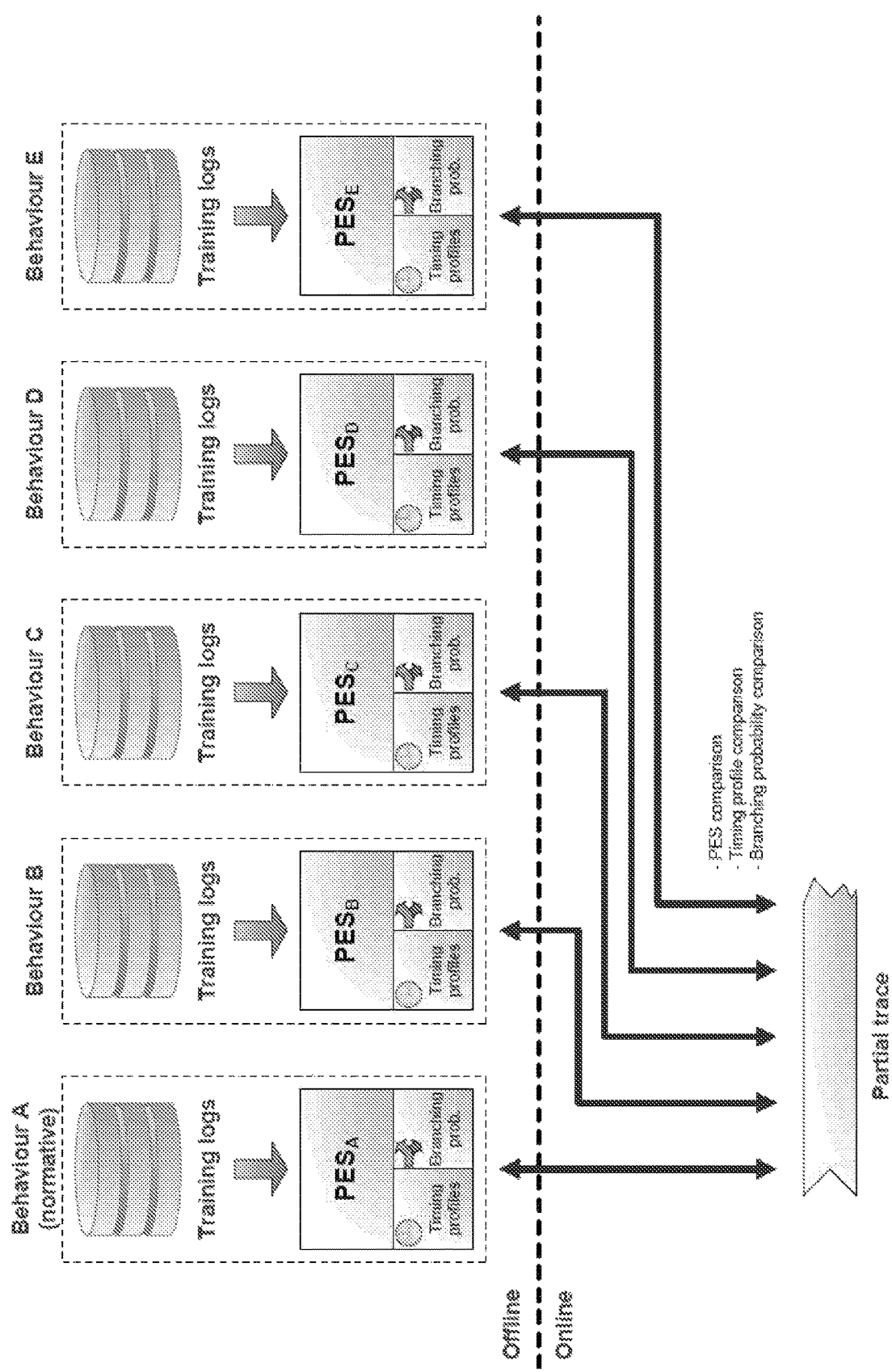
FIG. 5 illustrates the data flow on the data memory of computer system of FIG. 1 in more detail.
Figure 6:
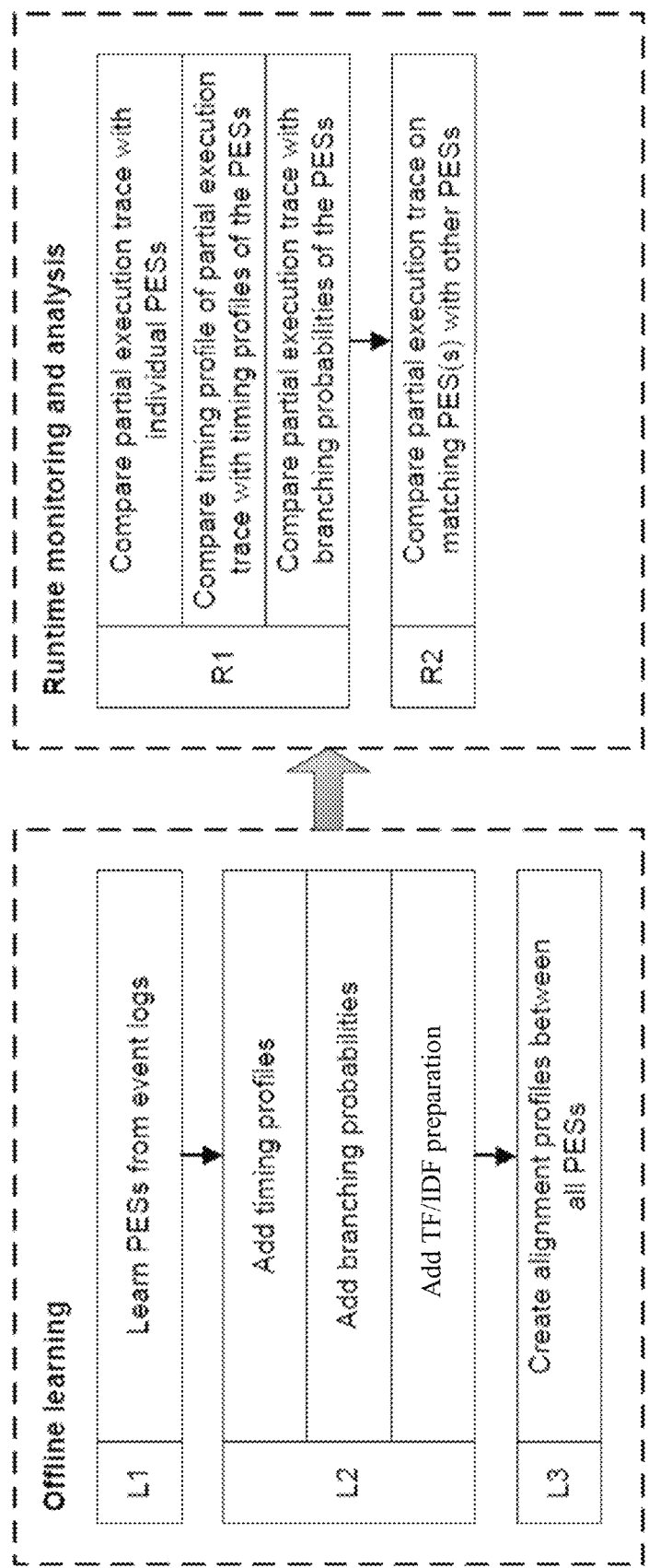
FIG. 6: Illustrates a separation into offline and online steps.

In FIG. 5, a graphical representation is provided of components of the method and their relations. In order to be able to perform the runtime comparison and analysis, a number of steps are included to obtain the data sets representing the full behavioral characteristics of each event log. In FIG. 6, an overview is provided of the offline learning steps and the runtime analysis steps. Each of these steps will be discussed in detail below.

Offline Learning
Learning PESs from Event Logs

An input consists of a set of labeled (historical) log traces for each behavioral category, i.e., one set of log traces for Behavior A, one for Behavior B, etc. Based on the input, the processor builds separate models for different behaviors in the form of event structures. Event structures can capture behavioral relations between events, summarize possible behaviors as represented in the underlying event log and provide a suitable mechanism for runtime comparison of the learned behaviors with a current execution of the process. PESs can be augmented with timing and branching frequencies, in order to be able to more precisely distinguish the currently observed behavior. Processor 102 stores the models for the different behaviours on data memory 106 in the form of node type variables and edge type variables or in a database, such as a relational (e.g. SQL) or graph database (e.g. CouchDB).

Augmenting PESs with Frequencies
Timing Profiles

In addition to the graph models of behavior, precise timing profiles are captured and stored on data memory 106 for each activity as observed in the log traces for each behavior category. Such a timing profile may constitute a probability density function of the observed execution times. Processor 102 may capture timing profiles for pairs of events that are connected in the event structure, i.e., the edges between any pair of events that have a direct and non-conflicting relationship. In addition to that, parallel relations are recorded both ways: When B∥C, then data memory 106 stores a distribution for B-C and an inverse (negative) distribution for C-B. This covers serialized executions of concurrent events, as realtime executions do not show concurrency of atomic events. In some examples, atomic events may not be broken down but they can indicate start and end of a higher-level activity, e.g., the event sequence (Act1.start, Act2.start, Act2.end, Act1.end) shows atomic events of concurrent execution of higher-level activities.

Branching Probabilities

For each behavior category, branching probabilities may be evaluated by processor 102 for each pair of events using Definition 2. For example, say in behavior A event $e_i$ is followed by event $e_j$ in 70% of the cases, whereas it is followed by event $e_k$ in 30% of the cases. If processor 102 determines that events in the current execution match the events as they occur in the learned event log (and are represented as such in the PES accordingly), processor 102 determines a correspondence value, such as the likelihood within that particular behavior, of such a sequence of events occurring. The processor can then distinguish and categorize the current behavior as one of the learned behaviors based on the likelihood as the correspondence value, even when the control-flow occurs in multiple learned behaviors.

Term Frequency

Term frequency—inverse document frequency (TF/IDF) may be determined by the processor to indicate a relative "importance" of events. The processor can then assign a weight to matches and mismatches between the current execution and the augmented event structure based on the TF/IDF. For example, if event e occurs in only one event structure, a match of e in the current execution with that event structure is deemed by the processor to be much more distinguishing than a match of an event that occurs in every event structure.

As such, the processor computes the term frequency (TF) of every event in each event structure. The term frequency of e is determined by the processor as equal to the number of traces that contain at least one occurrence of event e divided by the total number of traces in the log underlying the event structure. The processor computes the inverse document frequency (IDF) of event e as the logarithm of the inverse fraction of the event structures that contain e, or 0 if e does not occur in any event structure. The processor determines the TF/IDF as equal to the term frequency multiplied by the inverse document frequency.

Creating Alignment Profiles

Alignment profiles of PESs constitute the level of alignment the different behavior categories have with each other. For each partial trace in each PES, processor 102 computes the alignment with all other PESs. As such, this allows computing the probability that a current execution which has a match with one PES is actually part of another PES. This probability is also referred to as correspondence value. An overview of these comparisons is provided in FIG. 7.

For instance, at a given point during the execution, a trace from behavior A at that point has an average match (i.e. correspondence value) of 90% with behavior B, whereas a trace from behavior B at that same point may have only a 60% match on average with behavior A. This means that at that point, the execution (when assumed to be behavior A) is also likely to be matching behavior B. However, when it is assumed to be behavior B, it is less likely that it can be a behavior A instead. For example, at runtime processor 102 observes an execution up to that same point, which is a 100% match for behavior A and a 90% match for behavior B. This may indicate that both behaviors are high matches. However, knowing the above statistics reinforces the assessment that processor 102 observes a behavior-A trace, since these always have a 90% match with behavior B. Were it a trace of a behavior most similar to B, the match with behavior A should be around 60%, and not the observed 100%.

To this end, processor 102 creates alignment profiles as a post-processing step of the learning process. After creating all other artifacts (PESs for the different behaviors with timing profiles and branching probabilities), processor 102 "replays" the known traces for each of different behaviors and captures alignment data for the respective other behaviors. As a concrete example, processor 102 analyzes behaviors A-E and has created the behavior-specific artifacts as per above. Then processor 102 performs the following steps for all training traces of all behaviors. Consider behavior-A trace (which is known for training data). Processor 102 steps through the trace, and for each event checks the alignment up to that point against the other behaviors. For example, the current event is $e_j$. For it, processor 102 calculates the alignment of the trace up to $e_j$ with behavior B, and stores that value; processor 102 does the same for behaviors C, D, and E. After processor 102 replayed all training traces and collected all alignment values with the respective other behaviors, processor 102 combines these values into alignment profiles using the same means as for the timing profiles. In total, the number of alignment profiles processor 102 creates is $|E| \times (|B|-1)$.

Runtime Monitoring and Analysis

At runtime at each state, processor 102 evaluates the partial trace of the currently executed business process against each learned behavioral category represented by a respective graphical model for each dimension as enumerated during offline learning. This means processor 102 evaluates 202 the graphical model and determines the classification before a further log event is created and/or until a terminal node of the graph model is reached.

Comparing a partial execution trace with graphical models of behaviors

Prime Event Structures

The processor transforms the current partial execution trace σ into a PES, denoted herein by $P_{cur}$. As σ is a sequence of completed events $\sigma = \langle \lambda(e_0), \ldots, \lambda(e_{n-1}) \rangle$. $P_{cur}$ will consist of a set of events $e_0, \ldots, e_{n-1}$, where $e_i < e_{i+1}$ with $0 \le i < (n-1)$.

Subsequently, the processor compares $P_{cur}$ to PESs corresponding to each behavior, denoted herein by $P_A$, $P_B$, $P_C$, $P_D$ and $P_E$, by executing a synchronized simulation to generate a Partial Synchronized Product (PSP), which is in essence a synchronized simulation starting from the empty configurations as described in section 2.3 of N.R.T.P. van Beest and Marlon Dumas and Luciano Garca-Bañuelos and Marcello La Rosa, "Log Delta Analysis: Interpretable Differencing of Business Process Event Logs", Proc. of BPM 2015, pages 386-405, 2015, Springer. The synchronized simulation starts at an initial state of both PESs (i.e., no events have occurred so far). At each step, the processor matches events that can occur given the current state in each of the two PESs. If the processor determines that the events match, the processor adds the events to the current state of each PES and the simulation continues.

If the processor determines that an event in the current state of one PES does not match with an enabled event in the current state in the other PES, the processor declares a mismatch. Consequently, the processor sets the unmatched event as "hidden" in the PES where it did occur and the simulation jumps to the next matching state. As such, the PSP comprises the following operations: (i) match (m), (ii) left hide (lh)) and (iii) right hide (rh).

As $P_{cur}$ only represents a partial execution, the processor performs the simulation up to the last event in $P_{cur}$. That is, the processor does not take subsequent events in the learned PESs into account, as they did not yet occur in the current execution and can, therefore, not be matched. In addition, the processor does not take mismatches concerning events parallel to the last event in $P_c$ into account, as they are potentially not yet executed in $P_{cur}$ due to interleaving.

For each comparison, the processor searches for a sequence of PSP operations that maximizes the number of event matches, which is referred to herein as the optimal event matching $M_O$. The processor determines the PES requiring the least amount of hides to be the one closest to $P_{cur}$. Combinations of matches and mismatches indicate what is different between the learned behavior and the current execution.

The following situations are distinguished in the PSP:

Match e: event e occurs in both $P_i$ and $P_{cur}$.

Right hide e: event e does not occur in $P_i$. This indicates an illegal execution of e in $P_{cur}$.

Left hide e: event e does not occur in $P_{cur}$. This indicates a missing execution of e in $P_{cur}$.

Match e and right hide e: event e occurs in both $P_i$ and $P_{cur}$ but occurs again in $P_{cur}$ and not in $P_i$. This indicates an illegal repetition of e in $P_{cur}$.

Left hide e and right hide e: event e occurs in both $P_i$ and $P_{cur}$, but requires to be hidden in both PESs to maintain a matching state. This indicates that e occurs at the wrong time in $P_{cur}$.

Figure 9A:
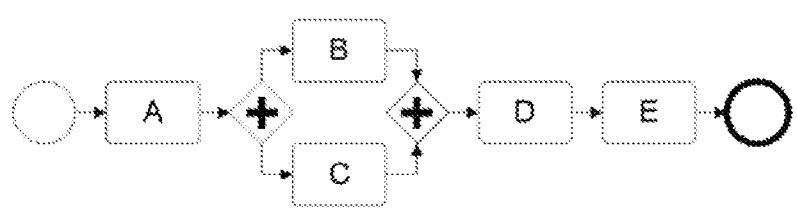
FIG. 9a: illustrates an example of Behavior B (deviant) in BPMN.
Figure 9B:
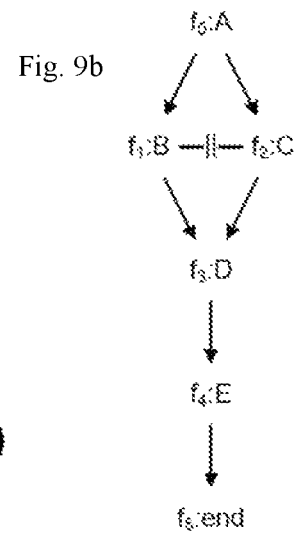
FIG. 9b: illustrates an example of Behavior B (deviant) as PES.

In one example, the procedure comprises two behaviors: nonnative behavior A and deviant behavior B. FIGS. 8a and 8b present the normative behavior as a BPMN model and the corresponding PES $P_A$ respectively. Each node in $P_A$ represents the event (e.g. $f_0$) and the corresponding activity (e.g. A). FIGS. 9a and 9b present deviant behavior B as BPMN along with its corresponding PES $P_B$, respectively.

Figure 10A:
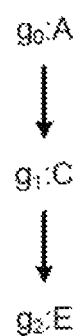
FIGS. 10a, 10b and 10c illustrates trimming PES $P_A$ to length of the current execution for PES $P_{cur}$, PES $P_A^{red}$ and PES $P_B^{red}$, respectively.

Consider a current partial execution trace $\sigma_{cur} = \langle A, C, E \rangle$. This partial execution can be converted into a PES $P_{cur}$, as shown graphically in FIG. 10a. The last event in $P_{cur}$ that also occurs in $P_A$ (i.e. the last common event) is E. Consequently, event end can be removed from $P_A$. Event D does not occur in $P_{cur}$, but as it is concurrent with E in $P_A$, it can be removed from $P_A$ as well. Although B is also missing in $P_{cur}$, it should occur prior to E and can, therefore, not be removed from $P_A$.

Figure 10B:
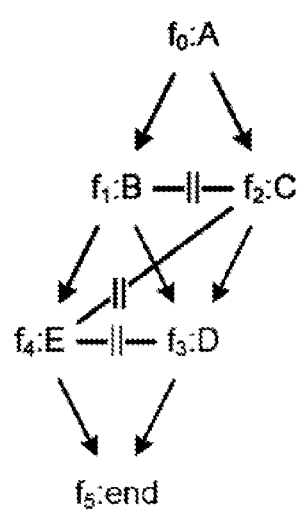

This can be formulated formally as follows. The last common event $e_{L_{cur}} \in P_{cur}$ is the event for which there exists an event $e_{L_P} \in P$, where $\lambda(e_{L_{cur}}) = \lambda(e_{L_P})$ and $\not\exists\, e_i \in P_{cur}$ such that $e_{L_{cur}} \le e_i$ and $\exists e_j \in P$ where $\lambda(e_i) = \lambda(e_j)$. Let $E_{cur}$ denote the set of events in $P_{cur}$ and $E_P$ denote the set of events in the learned PES P. Any event $e \in E_P \backslash E_{cur}$ with $e_{L_P} \le e$ or $e_{L_P} \| e$ is removed from P. For $P_A$ in this example, the resulting reduced PES $P_A^{red}$ is depicted graphically in FIG. 10b.

Figure 10C:
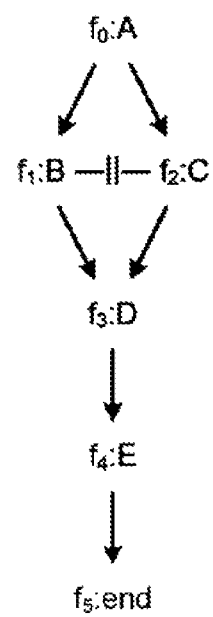

Similarly, PES $P_B$ can be reduced by removing end. However, D cannot be removed here, as D occurs before E in $P_B$ instead of concurrently in $P_A$. As such, $P_B^{red}$ can be depicted graphically as shown in FIG. 10c.

Figure 11A:
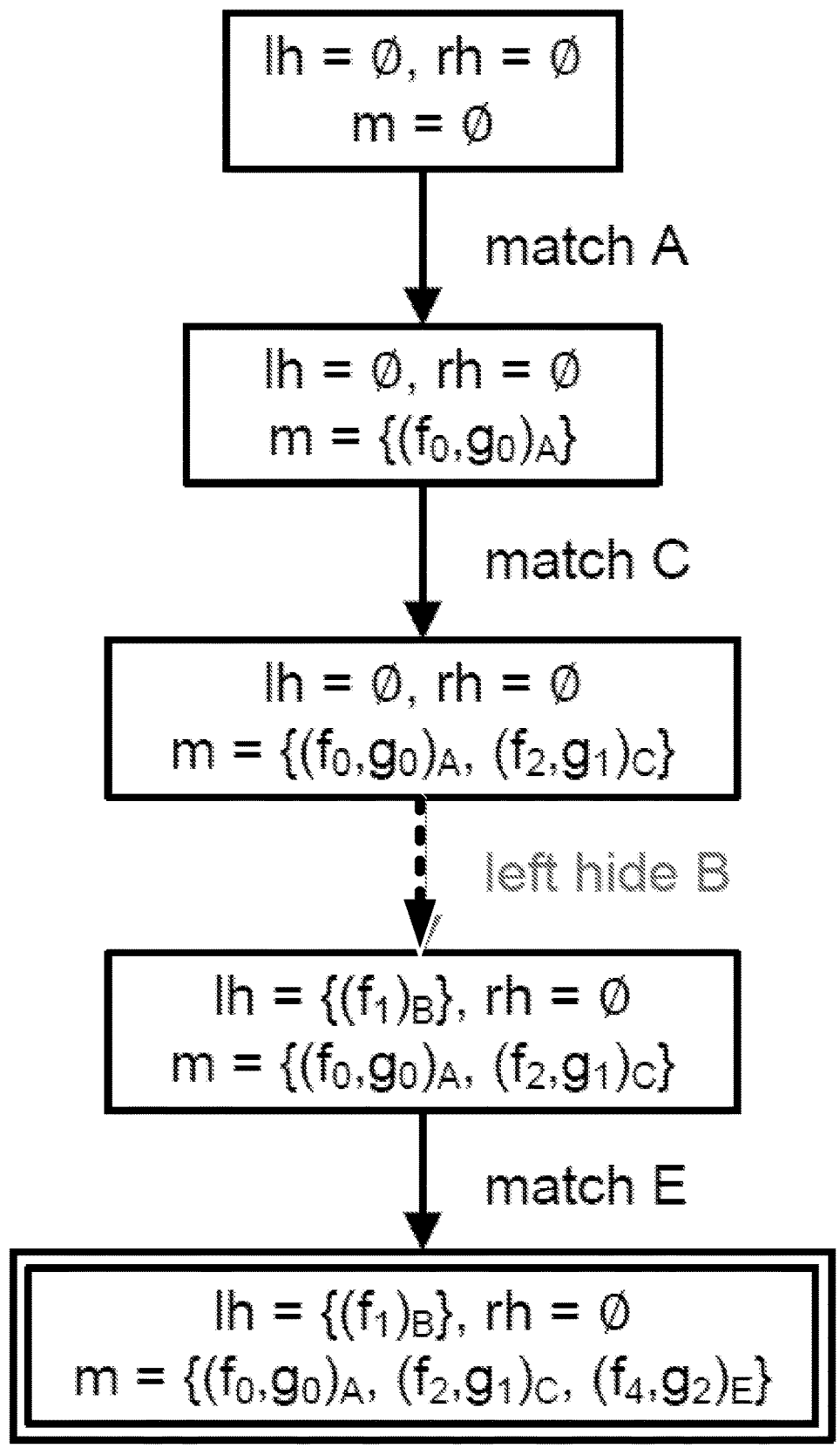
FIGS. 11a and 11b illustrate an excerpt of the resulting PSPs from comparing $P_A^{red}$ and $P_B^{red}$ with $P_{cur}$, for $PSP_A$ from $P_A^{red} P_{cur}$ and $PSP_B$ from $P_B^{red}$ and $P_{cur}$, respectively.
Figure 11B:
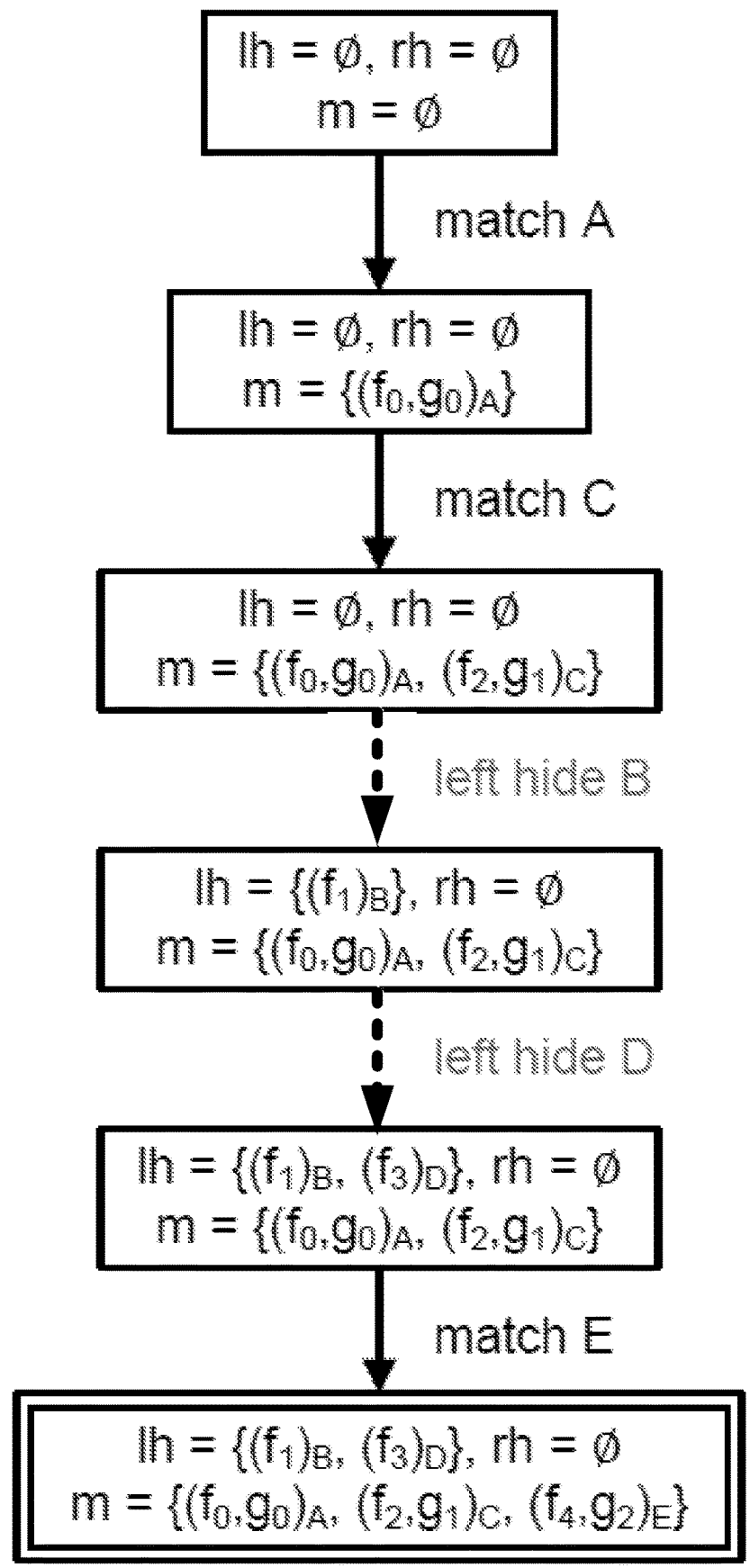

After reducing the PESs, the PSP can be created for each comparison. FIG. 11a depicts the PSP of $P_A^{red}$ and $P_{cur}$, whereas FIG. 11b depicts the PSP of $P_B^{red}$ and $P_{cur}$. The PSP, as determined by processor 102, is basically a path according to the log events between nodes within the set of nodes of the graph model, that is, the PES.

The set m records the events that have been matched in both PESs, while the sets lh and rh record the events that are hidden in $P_A^{red}$ and $P_{cur}$ respectively. $PSP_A$ starts with an empty state, i.e. m, lh and rh are empty. In both PESs, A can be executed and is, therefore, matched and added to m accordingly. Subsequently, C is matched. Event B occurs in $P_A^{red}$, but not in $P_{cur}$ and results, therefore, in a left hide of B. Finally, E can be matched. Note that $PSP_B$ is very similar, but requires an additional left hide of D. As such, $P_A^{red}$ provides a closer match to $P_{cur}$ than $P_B^{red}$. In other words, processor 102 determines a count of elements in one or more of the sets m, lh and rh. For example, processor 102 can count the number of elements in m and subtract the elements in lh and rh. This way, processor determines 204 a correspondence value in FIG. 11a as 3−1−0=2 and in FIG. 11b as 3−2−0=1. Other examples use logarithmic scores of matches and hides along with term frequency-inverse document frequency (TF/IDF).

Therefore, processor 102 determines 208 a classification by selecting the behavior of $P_A^{red}$ as it has the higher correspondence value. This way the correspondence value is indicative of a correspondence between the order of the multiple log events and the order of the nodes on the path shown in FIGS. 11a and 11b, respectively.

Control Flow Comparison with Multiple Events

While the above method provides significant advantages, there may be cases where the precision of determining a matching score based on individual mismatches can be further increased to determine an even more reliable prediction of the observed behavior. As such, processor 102 may use a more sophisticated comparison, where also the relative position between events in a subtrace are taken into account.

In FIGS. 12a, 12b and 13a, 13b, two examples are provided that both allow for very similar (partial) traces such that it is difficult to identify the appropriate behavior early on in the process.

Consider a current partial execution trace $\sigma_{cur}$=<A, C, D, B, E>, which largely matches both behaviors. FIGS. 14a, 14b, 14c shows $P_{cur}$ along with the reduced PESs $P_1^{red}$ and $P_2^{red}$, corresponding to the behaviors shown in FIGS. 12a, 12b and FIGS. 13a, 13b, respectively.

It can be seen that for both behaviors only B is misplaced in $P_{cur}$ (i.e. B is executed too late), which results in a left hide followed by a right hide of B in the PSP. As such, both behaviors would have a similar score w.r.t. the control-flow and the result would, therefore, be inconclusive. However, processor 102 can regard consecutive events as subtraces by analyzing consecutive matches. This way, processor 102 can distinguish the observed behavior as either $P_1$ or $P_2$. For instance, the subtrace <A, C, D> is only possible in $P_1$ (i.e. having B occur before A). In $P_2$, B occurs either before or after C, resulting in <A, B, C, D, . . . > or <A, C, B, D, . . . >. In addition, the pair <D, E> is typical for $P_2$, even though it may occur in $P_1$ as well as an alternative to <G, H>. The fact that $P_{cur}$ contains <A, C, D>, but not <D, E>, may indicate that processor 102 is observing Behavior 1 instead of Behavior 2.

Figure 15:
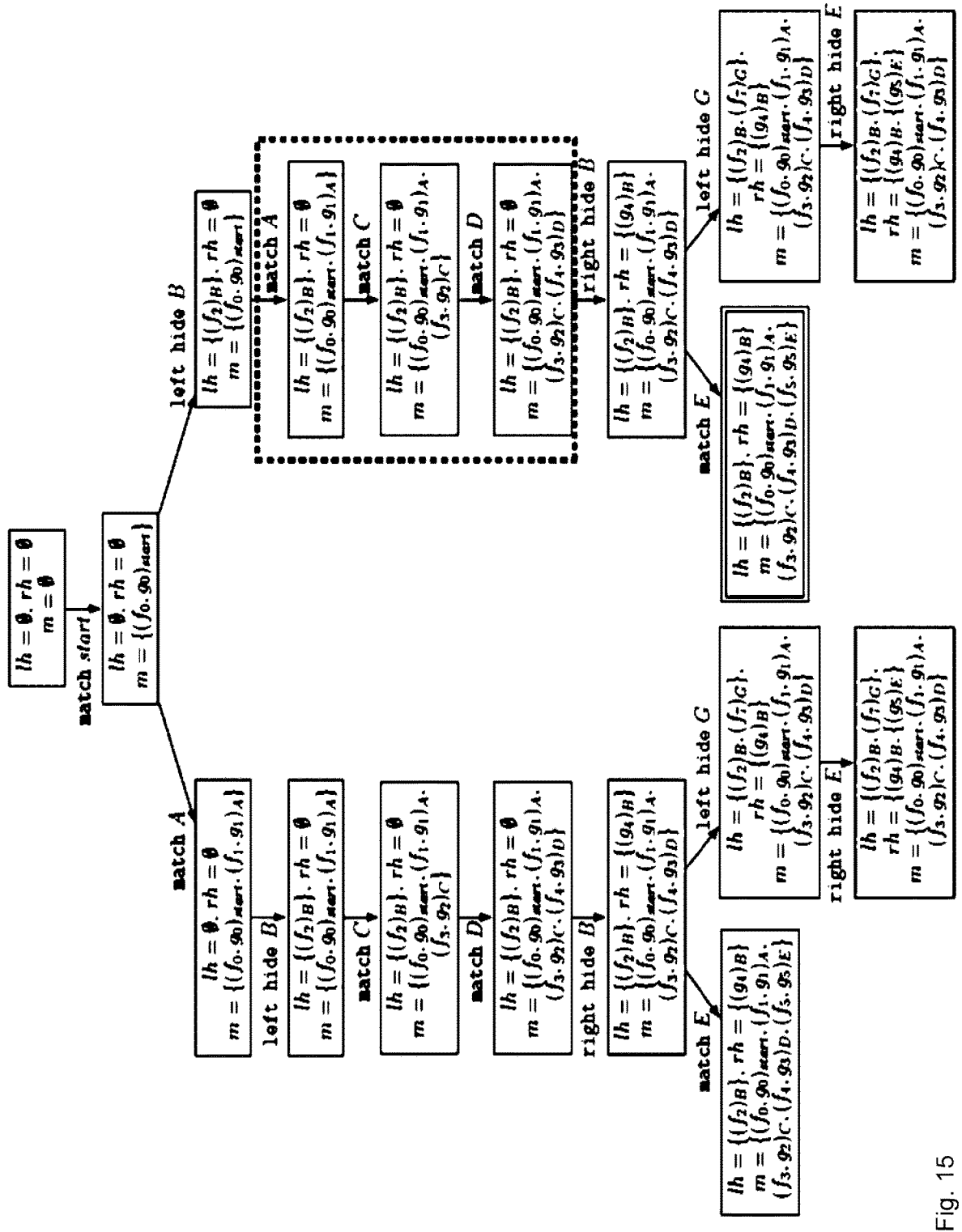
FIG. 15 illustrates $PSP_1$ from $P_1^{red}$ and $P_{cur}$.

This is illustrated graphically in FIG. 15, where the matching subtrace <A, C, D> is indicated by a dashed box. It can be seen that left hide B and right hide B surround the three consecutive matches (thereby indicating a mislocated occurrence of B).

Figure 16:
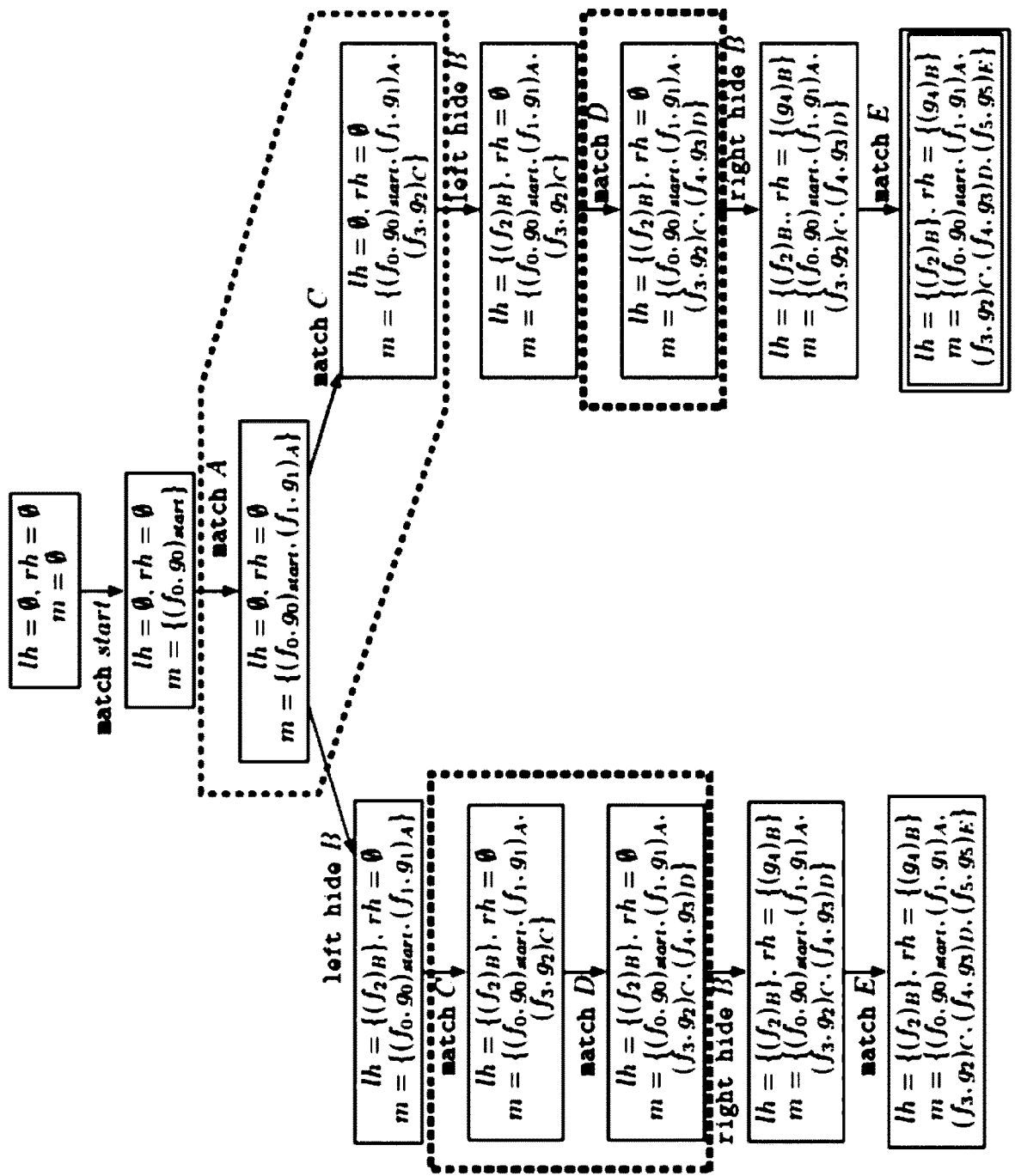
FIG. 16 illustrates $PSP_2$ from $P_2^{red}$ and $P_{cur}$.

In the PSP of $P_2^{red}$ and $P_{cur}$ (shown in FIG. 16), such a consecutive subtrace is not possible, as it is interrupted by the hides of B (as highlighted by a dashed outline). In neither of the PSPs (irrespective of the path) the subtrace <D, E> can be matched. Although both PSPs have the same number of matches and mismatches (and the same length of the optimal matching path), the amount of consecutive matches is higher in $PSP_1$, resulting in a higher matching score for the control-flow.

This comparison using multiple co-occurring events can provide better and more accurate results, particularly in highly unstructured processes, as it does not assess event occurrences in isolation, but also considers "patterns" that are distinctive for a certain behavioral category.

Timing Profiles

The timing profiles processor 102 learns offline are on the edges of the PES. For example, on the edge from event $e_i$ to $e_{i+1}$, the timing profile is based on the measured time between the timestamp of $e_i$ and $e_{i+1}$. For simplicity, to avoid a combinatorial explosion, and to abstract from complex dependencies, it is possible to focus on the duration between $e_i$ and $e_{i+1}$ where $e_i < e_{i+1}$ and with $0 \le i < (|\sigma|-1)$. This applies for both the offline learning and the runtime analysis. As such, processor 102 checks the timing profile for a pair of consecutive events.

When processor 102 observes a new event $e_i$ at runtime, processor 102 compares its timestamp with the timestamp of the preceding event $e_{i-1}$ and calculates the difference as $t_{i-1,i}$, provided that i>0. If i=0, $e_i$ is the first event of a process instance, in which case processor 102 skips this and all remaining steps. Otherwise, processor 102 finds the edge $(f_{j-1}, f_j)$ in the PES such that $\lambda(e_{i-1})=\lambda(f_{j-1})$ and $\lambda(e_i)=\lambda(f_j)$, where $f_{j-1} < f_j$ or $f_{j-1} \| f_j$. If such an edge exists, processor 102 retrieves the anomaly intervals associated with the edge (if any).

Then processor 102 checks if $t_{i-1,i}$ falls into one of the anomaly intervals; if so, processor 102 assigns the minimal degree of match for the timing dimension, else the maximal. However, if such an edge does not exist, either the observed event is not part of the PES or the event occurs in a different context (i.e. in a different part of the business process). In both cases, a mismatch is declared in the PSP.

If desired, processor 102 can instead analyze the exact degree of match between $t_{i-1,i}$ and the timing profile. Specifically, processor 102 can retrieve the exact probability density from the duration distribution as $pd(t_{i-1,i})$. However, the probability values—refer to FIG. 4—in the distributions tend to be low by nature of such functions. Processor 102 may therefore normalize the probability density value for degree of match, by diving the individual probability density value through the maximal value across the distribution $d_t(i-1,i)=pd(t_{i-1,i})/max_t(pd(t))$, where $max_t(pd(t))$ is the maximum of probability densities over all times.

As a concrete example, $t_{i-1,i}$=120,000 in the distribution shown in FIG. 4. Then the probability density is approx. $pd(t_{j-1,i})$=0.000020. Processor 102 normalizes this value by dividing it through the maximal value of approx. $max_t(pd(t))$=0.000180, and calculates a degree of match of $d_t(i-1,i)=pd(t_{i-1,i})/max_t(pd(t))$=0.1T̄.

This example shows that even rather likely times may result in a low degree of match in cases where the maximum is relatively much larger than the average. To counter this effect, processor 102 can use a smaller value as divisor in the normalization, and set the degree of match to the minimum of the exact value and 1: $d_t(i-1,i)=\min(1, pd(t_{i-1,i})/div)$, where div is the chosen divisor. In effect, if the probability density for the current edge is larger than the divisor, the function returns 1.

This method allows processor 102 to declare that certain probability density values are "good enough", to the point where it is not important to distinguish between them and processor 102 sets the degree of match to 1.

One question, however, is how to choose a suitable divisor div? The technique described under Timing Profiles above for defining anomaly intervals can be used for finding "normality intervals" instead, i.e., all durations for which the probability is above a threshold, say 80%. Then processor 102 can pick the minimal probability density value for these intervals, and set it as divisor. Effectively, that allows processor 102 to concentrate the differentiation of the degree of match to the 20% most unlikely timings, arguably the areas where differentiation will be most beneficial; for the top 80%, the degree of match is statically 1.

It is noted that timing profiles can cover arbitrary spans of relevance, like subsequences. That is, timing profiles are applied "point to point" where picking the points is independent of the direct causality relation in the corresponding event structure.

Branching Probabilities

When comparing event structures, there are a number of cases where the PSPs are inconclusive. That is, based on the identified difference, processor 102 cannot clearly categorize the current execution as one specific behavior. More specifically, $P_{cur}$ may have a similar or even identical match with two or more PESs as shown by an identical correspondence value. Branching probabilities identify the probability of occurrence of $e_j$ given that event $e_i$ has occurred, and will be used to distinguish those similar matches.

As such, processor 102 calculates 204 a correspondence value, such as a total probability of the closest matching trace in each PES: $\text{TotalProb}_{M_O} = \Pi \mathcal{P}([e_i],[e_j]) \forall e_i, e_j \in m \cup lh$ where $e_i < e_j$ with $m, lh \in M_O$. This way the correspondence value is indicative of a correspondence between the multiple log events and the behavior represented by the graphical model, that is, the PES.

Processor 102 repeats the steps of evaluating 202 the first graph model for one or more further graph models representing one or more further behaviors and determines the further correspondence values. That is, processor 102 checks 206 whether there is a further graph model to evaluate. If there is a further graph model, processor 102 repeats steps 202 and 204. If there is no further graph model, processor 102 terminates the loop.

Processor 102 then determines 208 a classification of the multiple log events as representing one of the behaviors based on the correspondence values. For example, the PES with highest total probability of the trace would be the one that is most likely describing the behavioral category of $P_{cur}$.

Alternatively, processor 102 may use the minimum branching probability between two events in the closest matching trace in each PES and compare: $\text{MinProb}_{M_O} = \text{Min}(\mathcal{P}([e_i],[e_j])) \forall e_i, e_j \in m \cup lh$ where $e_i < e_j$ with $m, lh \in M_O$. $\text{MinProb}_{M_O}$ would then serve as the correspondence value and processor 102 can select the PES with the highest $\text{MinProb}_{M_O}$ as the most likely to describe the behavior of $P_{cur}$.

If the best matches are similar (i.e. same number of matching events or hidden events), but the mismatches concern different events, the relevance of that mismatch is calculated and may then constitute the correspondence value. For every event $e_i \in lh$ in $M_O$, processor 102 computes $\mathcal{P}([e_{i-1}],[e_i])$ where $e_{i-1} < e_i$ and $e_{i-1} \in M_O$. Here, $\mathcal{P}([e_{i-1}],[e_i])$ defines the importance of $e_i$. If $\mathcal{P}([e_{i-1}],[e_i])$ is very low, the importance of a left hide of $e_i$ is lower than in case $\mathcal{P}([e_{i-1}],[e_i])$ would be very high.

The use of subtraces is also applicable to branching probabilities. Although branching probabilities apply to pairs of events, the branching probability of subsequent pairs of events (i.e. subtraces) can be calculated: e.g. if <A, B> has a branching probability of 0.8 and <B,C> had a branching probability of 0.5, then the branching probability of <A, B, C> would be 0.8*0.5=0.4. This is covered by total trace frequency for the entire trace as described earlier, but can be applied to a set of subsequent matching events (i.e. subtrace) as well.

Comparing Alignment Profiles

With all the above dimensions processor 102 can calculate a behavior-specific alignment value (i.e. correspondence value) for a partial trace, at a given point. Processor 102 can then compare this alignment value against the alignment profiles created during the training phase. To do so, processor 102 can use any one of the methods described above for timing profiles and the comparison of the observed duration with a duration distribution. After obtaining individual alignment profile match scores for the different other behaviors, processor 102 calculates their average and refers to it as the alignment profile degree of match $m_{ap}$.

For example, a partial trace has an alignment of 0.95 with behavior A and 0.85 with behavior B. To use the example from offline learning above, it may be common for a behavior-A trace to have a high alignment value at this point with behavior B; but it may be uncommon for a behavior-B trace to have a high alignment with A. Then this is a further indication that processor 102 is indeed observing a behavior-A instance.

In addition, if behavior is observed that is different from any learned behavior, the statistical significance of the observed "level of deviance" can be obtained. As such, precise metrics can be provided on the likelihood of the occurrence of actual unknown deviance when assuming a specific learned behavior.

Combining the Results and Deciding on the Outcome

Above, it is described how processor 102 calculates a correspondence value indicative of a degree of match for the various dimensions of matching. These individual values can be combined into a single number per known behavior, such that processor 102 can make an assessment as to which behavior processor 102 is currently observing. This can be done twice: before and after calculating the degree of match with the alignment profiles. Before, processor 102 includes all other degrees of matches except the one with alignment profiles; after, processor 102 includes all of them.

One example method to achieve this is to calculate a weighted linear combination from the different factors (for behavior b, with weights $\omega_i$ and the different degrees of match as $d_i$):

$$d(b) = \frac{\omega_1 \times d_1 + \omega_2 \times d_2 + \ldots + \omega_n \times d_n}{\sum_{i=1 \ldots n} \omega_i}$$

The above combination provides an overall matching score (i.e. correspondence value) $d(b)$ per behavior b. When comparing these matching scores for the different behaviors, there can be three outcomes:

No matching score is high enough, i.e., $\forall_{b \in Beh}: d(b) < tr_d$ for some predefined threshold $tr_d$ with $0 < tr_d < 1$, for example 0.6, and Beh as the set of behaviors. In this case, processor 102 concludes that a previously unknown behavior is observed.

One matching score is a lot higher than the others, i.e., $\forall_{b \in Beh \setminus \{b'\}}: d(b) < f_m \times d(b')$ where $f_m$ is a matching factor with $f_m > 1$, for example 2. In this case, processor 102 concludes that it is reasonably certain that a trace of behavior b' is observed.

If neither of the above is the case, then there is a set of well matching behaviors, but which one of these are currently observed is not (yet) clear. The set of behaviors processor 102 considers "well matching" is determined as $(b \in Beh \backslash d(b) \geq f_d \times \max_{b' \in Beh} (d(b')) \wedge d(b) \geq tr_d)$, where $f_d$ is a factor with $0 < f_d < 1$, for example, 0.8.

The outcome is dependent on the current incomplete trace that is observed, and can thus change with each new event that is captured and processed.

Based on the determined classification, that is, based on the selected PES with the highest correspondence value, processor 102 may generate an alert. That alert may be an indication on a user interface, such as an icon or an alert message. For example, processor 102 may display the message "Malicious behavior detected" if the PES for malicious behavior has the highest correspondence value or "Suspicious behavior detected" if the PES for suspicious behavior has the highest value. Further, processor 102 may generate the alert in the form of an electronic message, such as an email or SMS. The email or SMS may include a link that the administrator can activate to retrieve further information on the detected behavior. In yet another example, the alert may be directed to another computer system, such as a web server, to activate additional firewall rules or otherwise commence mitigation action or even completely shut down the server and potentially spin up a separate virtual machine with a mirrored server version.

The disclosed method distinguishes several types of behavior, and detects which of these is observed at runtime i.e. before the whole log is available. Neither of the two points (multiple behaviors, runtime analysis) is possible in other methods.

The method and system support fine-grained understanding of systems—socio-technical, cyber-physical, or cyber-only systems—as long they log events. As such, it could in the future even be used to understand and control how an Artificial Intelligence system is operating. It can also be used to understand customer behavior, e.g., in subscription-based companies where customer success and satisfaction is of utmost importance for retention, and thus profit. Finally, an example of cyber-physical systems where the method can be beneficial is logistics processes, where fine-grained tracking can ensure delays are avoided, as well as fraud, theft, or smuggling.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximizing" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. An internet server comprising:
   a user input port connected to the internet to create user events based on user input received via the internet;
   a logging module to create log data comprising multiple log events representing the user events and to store the log data on a database, the log events representing one execution of a process;
   a data store to store a first graph model comprising data records representing a first set of nodes and data records representing a first set of edges, the first set of nodes being connected by the first set of edges, in the first graph model, to represent a first user behavior, which corresponds to historical log data of the first user behavior, and to store further graph models representing further user behaviors, each of the further user behaviors being different than the first user behavior;
   a processor to perform the steps of
      creating a log graph model that represents the multiple log events,
      evaluating the first graph model with the multiple log events, representing the one execution of the process, by performing multiple steps that simultaneously traverse the log graph model and the first graph model to determine at each step of the multiple steps a match or mismatch between a node of the log graph model and the first graph model,
      determining a first correspondence value based on the match or mismatch, the first correspondence value being indicative of a correspondence between the multiple log events and the first user behavior,
      repeating (i) the step of evaluating to evaluate one or more of the further graph models representing corresponding one or more of the further user behaviors, and (ii) the step of determining to determine one or more further correspondence values each indicative of a correspondence between the multiple log events, representing the one execution of the process, and a respective one of the further user behaviors, and
      determining a classification of the multiple log events as representing one of the user behaviors by selecting, amongst the first user behavior represented by the first graph model and the further user behaviors represented by the corresponding further graph models, the one of the user behaviors that has the highest correspondence value indicating the closest match between the respective graph model and the multiple log events; and
   an output module to generate an output signal that causes the internet server to perform an action depending on the classification.

2. A method for analyzing log data of a computer system, the method comprising the steps of:
   creating a log graph model that represents multiple log events,
   evaluating, by a computer processor, a first graph model with the multiple log events in the log data, the log events representing one execution of a process, wherein the first graph model comprises a first set of nodes connected by a first set of edges, the first graph model representing a first behavior, said evaluating including performing multiple steps that simultaneously traverse the log graph model and the first graph model to determine at each step of the multiple steps a match or mismatch between a node of the log graph model and the first graph model;

determining a first correspondence value based on the match or mismatch, the first correspondence value being indicative of a correspondence between the multiple log events and the first behavior;

repeating, by the computer processor, (i) the step of evaluating to evaluate one or more further graph models representing one or more further behaviors, each of the one or more further behaviors being different than the first behavior, and (ii) the step of determining to determine one or more further correspondence values each indicative of a correspondence between the multiple log events, representing the one execution of the process, and a respective one of the further behaviors; and determining, by the computer processor, a classification of the multiple log events as representing one of the behaviors by selecting, amongst the first behavior represented by the first graph model and the further behaviors represented by the corresponding further graph models, the one of the behaviors that has the highest correspondence value indicating the closest match between the respective graph model and the multiple log events.

3. The method of claim 2, wherein
evaluating the first graph model comprises determining a first path according to the multiple log events between nodes within the first set of nodes along edges in the first set of edges; and
determining the first correspondence value is based on the first path.

4. The method of claim 3, wherein the first correspondence value is indicative of a correspondence between the order of the multiple log events and the order of the nodes on the first path, or is based on a branching probability associated with each edge along the first path.

5. The method of claim 2, wherein determining the first correspondence value comprises determining a matching set of nodes that match the multiple log events and the correspondence value is based on a number of elements in the matching set of nodes.

6. The method of claim 2, wherein determining the first correspondence value comprises determining a mismatching set of nodes that do not match the multiple log events and the correspondence value is based on a number of elements in the mismatching set of nodes.

7. The method of claim 2, wherein determining the first correspondence value is based on subtraces of consecutive events.

8. The method of claim 2, wherein the first correspondence value is based on timing information associated with one or more nodes or edges of the first graph model.

9. The method of claim 8, wherein the timing information is a probability distribution of the time associated with the event.

10. The method of claim 2, wherein the first correspondence value is based on an alignment value associated with each edge or node of the first graph model, wherein the alignment value is indicative of a level of alignment with each of the further graph models.

11. The method of claim 2, further comprising generating, by the computer processor, an alert based on the determined classification.

12. The method of claim 2, wherein the first behavior is a malicious behavior.

13. The method of claim 2, wherein the step of determining the classification comprises determining the classification before creating a further log event.

14. The method of claim 2, wherein the step of determining the classification comprises determining the classification before reaching a terminal node of the first graph model.

15. The method of claim 2, further comprising:
receiving, by the computer processor, historical log data and associated behavior labels; and
determining, by the computer processor, the nodes and edges of the first graph model based on the historical log data and associated behavior labels; and
determining for each edge or for each node one or more of:
a branching probability;
alignment profiles; and
transition timing information.

16. The method of claim 2, wherein the first graph model is an event structure.

17. A non-transitory computer readable medium with program code stored thereon that, when executed by a computer, causes the computer to perform the method of claim 2.

18. A computer system for analyzing log data, the computer system comprising:
an input port to receive log data comprising multiple log events, the log events representing one execution of a process;
a memory to store a first graph model and one or more further graph models;
a processor to perform the steps of:
creating a log graph model that represents the multiple log events,
evaluating the first graph model with the multiple log events, representing the one execution of the process, wherein the first graph model comprises a first set of nodes connected by a first set of edges, the first graph model representing a first behavior, said evaluating including performing multiple steps that simultaneously traverse the log graph model and the first graph model to determine at each step of the multiple steps a match or mismatch between a node of the log graph model and the first graph model,
determining a first correspondence value based on the match or mismatch, the first correspondence value being indicative of a correspondence between the multiple log events and the first behavior,
repeating (i) the step of evaluating to evaluate the one or more further graph models representing one or more further behaviors, with the multiple log events representing the one execution of the process, each of the one or more further behaviors being different than the first behavior, and (ii) the step of determining to determine one or more further correspondence values each indicative of a correspondence between the multiple log events, representing the one execution of the process, and a respective one of the further behaviors, and
determining a classification of the multiple log events as representing one of the behaviors by selecting, amongst the first behavior represented by the first graph model and the further behaviors represented by the corresponding further graph models, the one of the behaviors that has the highest correspondence value indicating the closest match between the respective graph model and the multiple log events; and an output port to output the determined classification.

19. The method of claim 2, wherein the first graph model representing the first behavior is distinct from the one or more further graph models representing the one or more further behaviors.

* * * * *